Figure 1:
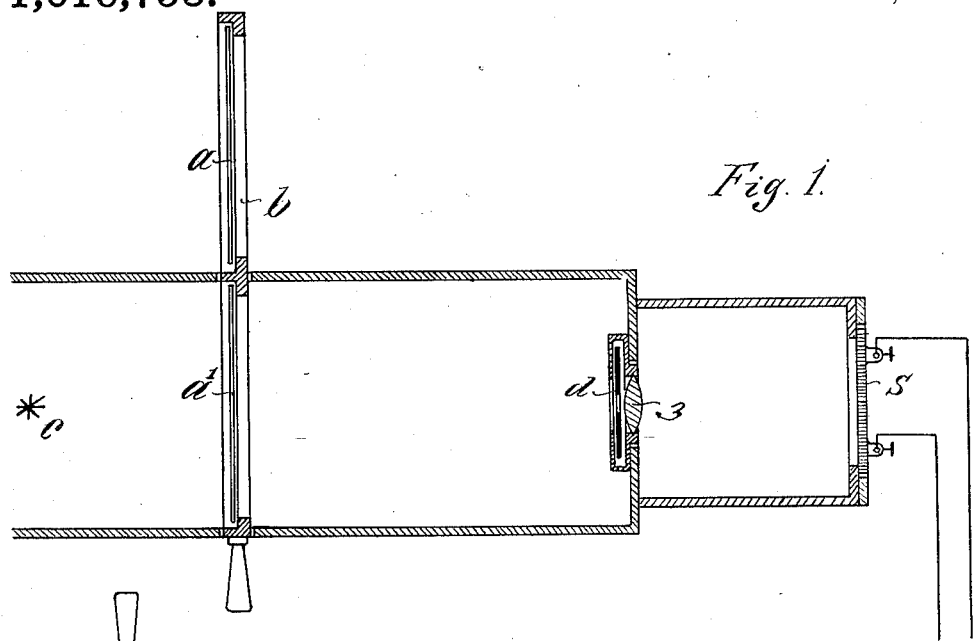

R. LEUMANN.
PERMEABILITY MEASURING APPARATUS.
APPLICATION FILED JAN. 12, 1911.

1,016,753.

Patented Feb. 6, 1912.

Witnesses
P. V. Dommers
M. H. Darg

Inventor.
Richard Leumann,
By Henry Orth Jr.
Atty.

UNITED STATES PATENT OFFICE.

RICHARD LEUMANN, OF MONTHEY, SWITZERLAND.

PERMEABILITY-MEASURING APPARATUS.

1,016,753.   Specification of Letters Patent.   Patented Feb. 6, 1912.

Application filed January 12, 1911. Serial No. 602,166.

*To all whom it may concern:*

Be it known that I, RICHARD LEUMANN, a citizen of the Swiss Republic, and residing at Monthey, Ct. Wallis, Switzerland, have invented certain new and useful Improvements in Permeability-Measuring Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is an apparatus by means of which photographic negatives or other materials can be examined on the subject of their permeability for rays of light. The source of light needs to be almost invariable; its light at first passes through the negative which is to be examined, then passes a diaphragm whose opening can be varied, and at last is projected on the surface of a selenium cell. As is known, the electric resistance of the selenium cell varies according to the intensity of the illumination of the surface of the cell. In the present instrument it is aimed to keep the resistance of the cell at a constant value, which, notwithstanding the varying permeability of the negatives, can be realized by regulating the size of the opening in the diaphragm.

At the present time several instruments for measuring the intensity of light, or photometers, are known, in which selenium cells are employed. It must be pointed out, however, that these instruments can only be used for measuring the absolute intensity of light, or rather for comparing different sources of light of various intensity, whereas the apparatus of the present invention is intended for measuring that part of the light emitted from the source, and which passes through, *i. e.*, which is not absorbed by the negative. In this case there are not several sources of light of varying intensity, there is only one source, which must be as invariable as possible. This proceeding may be called relative intensity measuring. It is only for this work that selenium cells may advantageously be employed, and not for absolute intensity measuring, because the different sources of light always emit light of different color. Owing to this fact faulty measurements are caused, because the selenium is much more sensitive to yellow and red rays than to blue and violet rays. If, on the contrary, only one source of light is needed, as is the case in the instrument of the present invention, then the light is of the same color for all the measurements. The color of the light is not changed by the photographic negative, the silver contained in the latter being perfectly black and producing no other effect than to retain or absorb a part of the light emitted by the source. The measurements executed with the present invention must therefore be absolutely exact.

It is of extreme importance to avoid the phenomenon of inertia of the selenium, for this phenomenon would be the cause of a slow and inexact working of the apparatus. The inertia is avoided by maintaining the illumination of the selenium cell as constant as possible. For this purpose, as has been said before, the opening of the diaphragm must be regulated according to the density of the negative. If the negative is very dense, the diaphragm opening must be large, if the negative is clear or thin, the diaphragm needs to have but a small opening. It is therefore important that the diaphragm opening be prepared or regulated according to the density of the negative to be measured even before the negative is put into the apparatus. The preparation of the diaphragm can of course only be made by guess and will not be quite exact, however, the illumination obtained by the so prepared diaphragm will not vary so much from the standard as it would have varied without any preparation or adjustment whatever. The permeability of the negatives is thus in inverse proportion to the respective openings of the diaphragms.

The light needs to be distributed equally or uniformly over the surface of the selenium cell and, again because of inertia, it would be disadvantageous to have dark and light spots on the cell. To avoid this an opaque or ground glass is inserted behind the diaphragm, and furthermore the camera is provided with specular or reflecting walls. These walls not only equalize the illumination of the selenium cell, but they also re-collect the rays that owing to the dispersing action of the ground glass would not get onto the selenium cell, and therefore would be lost. The equalizing action of the specular walls consists in throwing on the same spot on the surface of the selenium cell, rays that have passed through different points of the negative. A sort of tube whose walls are mirrors does collect diverging rays, as has been pointed out; therefore such a tube can vary advantageously be put between the source of light and the negative. The illumination of the negative is by this means made much more intense.

Figure 2:
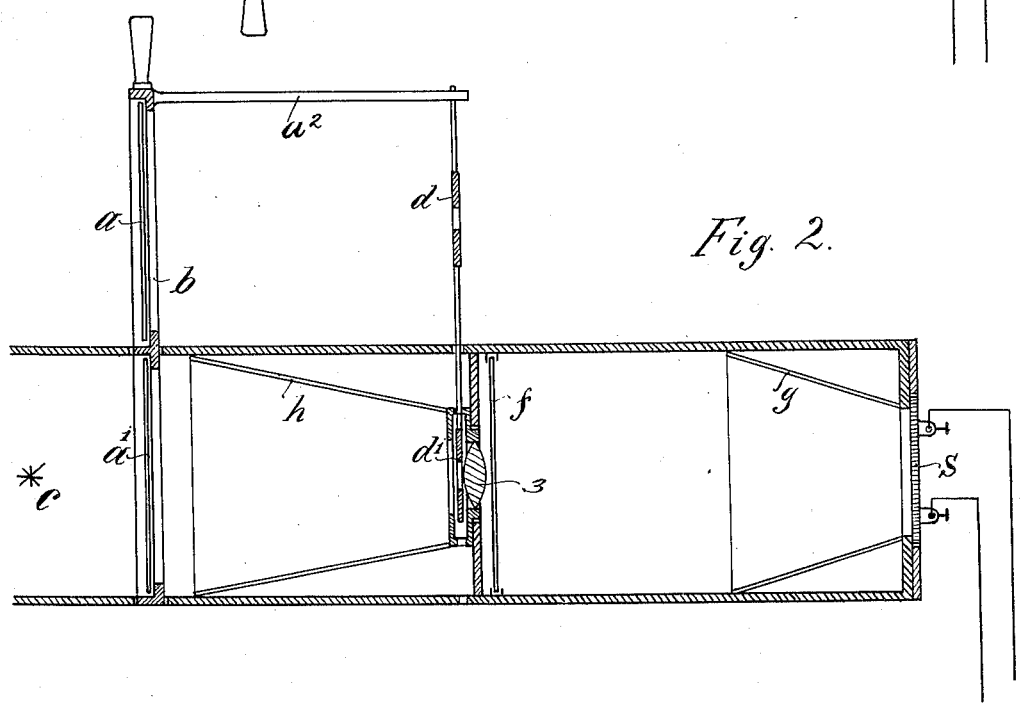

Referring to the accompanying drawings, in which like parts are similarly designated—Figure 1 is a horizontal, longitudinal section of one form of apparatus, and Fig. 2 is a similar view of a modification.

In Fig. 1 is shown an apparatus of the kind described for measuring the permeability of materials (negatives). $a$ and $a'$ are the two negatives that are to be examined. They are fixed or held in a frame $b$ which can be moved in slots provided in the walls of the camera or case 2. By shifting the frame in one or the other direction one or the other of the two negatives can be placed before the diaphragm $d$. The source of light is designated by $c$, the selenium cell which is fixed to the back of the camera, by $s$. The lens 3 for focusing the light on the cell $s$ is placed preferably, but not necessarily, back of the diaphragm.

Fig. 2 shows another form of the apparatus in which the ground glass, the tube with the specular walls and the mechanism for shifting the adjusted diaphragm $d'$ are illustrated. The latter mechanism is intended for simultaneously positioning the negative and its pertaining diaphragm whose opening has been adjusted by guess according to the density of the negative. The diaphragms $d$ and $d'$ may be connected by an arm $a^2$ to the frame $b$. They may, however, be moved by any other mechanism which is put in motion by the frame $b$. $f$ is the ground glass, $g$ the tube with the specular or reflecting walls between the diaphragm and the selenium cell, and $h$ is a similar tube between the source of light and the negative. The lens 3 is shown between the diaphragm and the ground glass $f$, and though I prefer this arrangement they may be placed in any other order.

The operation will be as follows: In measuring the permeability of objects whose density varies within narrow limits, as sheets of glass, it is simply necessary to place the object in the holder $a$ between the source of light $c$ and the selenium cell $s$ and note the variation of conductivity of the cell, which is indicated by a galvanometer, or in any other suitable well known manner. Should the permeability of the objects vary considerably, as in photographic negatives, it is desirable to use a diaphragm $d$ positioned so that the light passes through the object and the diaphragm to the cell $s$, for the purpose hereinbefore described. Various positions or areas of opening in the diaphragm to obtain constant conductivity of the cell will then be an indication of the permeability of the negative or other object.

In order not to illumine the cell in spots, as would be the case with an object of non-uniform density, as a negative, I focus the light that has passed through the object, by means of lens 3, on the cell, first passing it through a diffuser, as a ground glass plate $f$. The area of the diaphragm opening, or the diameter thereof, will in like manner be an indication of the relative permeability of the negative for constant conductivity of the cell.

The negatives that are to be compared are both put in the frame $b$. One of the negatives is then in the path of the rays of light and the pertaining diaphragm retains a part of them while the selenium cell receives a determined quantity of light which corresponds to a determined resistance of the cell which is measured and noted. Now the second diaphragm is mounted in frame $b$ with a diaphragm selected according to the density of the second negative, and then the frame $b$ is shifted so that the second negative and its diaphragm are in the path of the rays of light. If the galvanometer needle does not then move, this means that the diaphragm was well selected and that the densities of the negatives are in the same proportions as the areas of the diaphragms. If, on the contrary, the galvanometer needle changes its position, then the selected diaphragm was not quite right, and it must be replaced by another or its size altered if an iris diaphragm is used, and this proceeding is to be repeated until the right diaphragm is found.

The apparatus may be operated without a diaphragm, though in order to avoid the inertia it is preferable to employ one. In operating without a diaphragm the resistance of the selenium cell cannot be kept constant. There is then a resistance value for each negative, and the densities of the negatives will then be dependent upon the resistances of the cell.

I claim—

1. Apparatus for measuring the permeability of objects to light, comprising a source of light, a selenium cell in the path of the rays from said source and a holder for the object whose permeability is to be measured located between the source of light and the cell.

2. Apparatus for measuring the permeability of objects to light, comprising a source of light, a selenium cell in the path of the rays from said source, means to support the object whose permeability is to be measured situated between the source and cell, and a diaphragm between the object and cell.

3. Apparatus for measuring permeability to light, comprising a source of light, a selenium cell in the path of the rays from said source, means between the source and cell to support the object whose permeability is to be measured, a diaphragm between the object and cell and a specular walled tube between the diaphragm and cell.

4. Apparatus for measuring permeability to light, comprising a source of light, a selenium cell in the path of the rays from said source, means between the source and cell to support the object whose permeability is to be measured, a diaphragm between the object and cell, a specular walled tube between the diaphragm and cell, and a similar tube between the source and object.

5. Apparatus for measuring the permeability of objects to light, comprising a source of light, a selenium cell in the path of the rays from said source, a holder for the object whose permeability is to be measured located between the source of light and the cell and a light dispersing means in front of the cell.

6. Apparatus for measuring the permeability of objects to light, comprising a source of light, a selenium cell in the path of the rays from said source, means to support the object whose permeability is to be measured situated between the source and cell, a diaphragm between the object and cell and a light dispersing means between the diaphragm and cell.

7. Apparatus for measuring permeability to light, comprising a source of light, a selenium cell in the path of the rays from said source, means between the source and cell to support the object whose permeability is to be measured, a diaphragm between the object and cell, a specular walled tube between the diaphragm and cell and a ground glass in front of said tube.

8. In an apparatus for measuring permeability to light, a casing, a frame movable therein to hold the object to be measured, and a diaphragm connected to the frame and movable simultaneously therewith.

9. In an apparatus for measuring permeability to light, a casing, a source of light, a selenium cell in the path of rays from said source, a slide movable in said casing between said source and cell, adapted to carry a plurality of negatives, and a like number of diaphragms secured to and movable with the slide.

10. Apparatus for measuring the permeability of objects to light, comprising a source of light, a selenium cell in the path of the rays from said source, means to support the object whose permeability is to be measured situated between the source and cell, a diaphragm between the object and cell and a lens behind the diaphragm.

11. Apparatus for measuring the permeability of objects to light, comprising a source of light, a selenium cell in the path of the rays from said source, a holder for the object whose permeability is to be measured located between the source of light and the cell, a light dispersing means in front of the cell, and a lens in front of said light dispersing means.

In testimony that I claim the foregoing as my invention, I have signed my name in presence of two subscribing witnesses.

RICHARD LEUMANN.

Witnesses:
   Jos. Barlake,
   Chapfer Adolph.